US010349301B2

(12) United States Patent
Toth et al.

(10) Patent No.: US 10,349,301 B2
(45) Date of Patent: Jul. 9, 2019

(54) NETWORK NODES AND METHODS THEREIN FOR ENABLING EVENTS TRIGGERED BY A WIRELESS DEVICE TO BE REPORTED IN A WIRELESS COMMUNICATIONS NETWORK

(71) Applicant: Telefonaktiebolaget LM Ericsson (publ), Stockholm (SE)

(72) Inventors: Stefan Karl Toth, Göteborg (SE); Lars Lövsén, Göteborg (SE); Gunnar Rydnell, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/759,956

(22) PCT Filed: Sep. 18, 2015

(86) PCT No.: PCT/EP2015/071468
§ 371 (c)(1),
(2) Date: Mar. 14, 2018

(87) PCT Pub. No.: WO2017/045728
PCT Pub. Date: Mar. 23, 2017

(65) Prior Publication Data
US 2018/0255474 A1    Sep. 6, 2018

(51) Int. Cl.
*H04W 24/00* (2009.01)
*H04W 24/10* (2009.01)
(Continued)

(52) U.S. Cl.
CPC ............. *H04W 24/10* (2013.01); *H04W 4/70* (2018.02); *H04W 8/04* (2013.01); *H04W 8/08* (2013.01);
(Continued)

(58) Field of Classification Search
CPC ............................... B64C 13/20; H04W 88/04
(Continued)

(56) References Cited

U.S. PATENT DOCUMENTS 9,219,819 B1 * 12/2015 Glass .................. H04M 3/5191
2012/0264443 A1 * 10/2012 Ng ........................ H04W 60/04
455/450

(Continued)

OTHER PUBLICATIONS

International Search Report and Written Opinion of the International Searching Authority, PCT/EP2015/071468, dated May 10, 2016, 17 pages.

(Continued)

*Primary Examiner* — Kiet M Doan
(74) *Attorney, Agent, or Firm* — Sage Patent Group (57) ABSTRACT

A method performed by a first network node operating in a wireless communication network for enabling events triggered by a wireless device served by the first network node to be reported in the wireless communications network is provided. The first network node determines that an event has been triggered by the wireless device. Then, the first network node context information associated with the wireless device from a database node that is shared externally by the first network node with one or more network nodes in the wireless communications network, which context information indicates that events triggered in the first network node by the wireless device is to be reported in the wireless communications network. After the obtaining, the first network node determines that events triggered by the wireless device is to be reported in the wireless communications network based on the obtained context information.

20 Claims, 6 Drawing Sheets

(51) Int. Cl.
*H04W 8/04* (2009.01)
*H04W 16/18* (2009.01)
*H04W 24/08* (2009.01)
*H04W 4/70* (2018.01)
*H04W 8/08* (2009.01)

(52) U.S. Cl.
CPC ........... *H04W 16/18* (2013.01); *H04W 24/00* (2013.01); *H04W 24/08* (2013.01)

(58) Field of Classification Search
USPC .......... 455/456.2, 436, 456.1, 411, 420, 509, 455/432.1, 422.1, 41.2; 370/338, 254, 370/328, 336, 329, 252
See application file for complete search history.

(56) References Cited

U.S. PATENT DOCUMENTS

2013/0042011 A1* 2/2013 Sugizaki .............. H04Q 3/0045
709/227

2014/0134996 A1 5/2014 Barclay et al.
2015/0181492 A1* 6/2015 Schmidt ................ H04W 36/30
455/443

OTHER PUBLICATIONS

"Technical Specification Group Services and System Aspects; Monitoring Enhancements," (Release 13) 3GPP TR 23.789 V13.0.0 (Mar. 2015) Mar. 24, 2015, XP050961181, 33 pages.

"Technical Specification Group Services and System Aspects; Study on Machine-Type Communications (MTC) and other mobile data applications communications enhancements," (Release 12) 3GPP TR 23.887 V12.0.0 (Dec. 2013) Dec. 20, 2013, XP050906655, 151 pages.

"Technical Specification Group Services and System Aspects; Policy and charging control architecture," (Release 13) 3GPP TS 23.203 V13.4.0 (Jun. 2015) Jun. 25, 2015, XP050985112, 235 pages.

* cited by examiner

NETWORK NODES AND METHODS THEREIN FOR ENABLING EVENTS TRIGGERED BY A WIRELESS DEVICE TO BE REPORTED IN A WIRELESS COMMUNICATIONS NETWORK

CROSS REFERENCE TO RELATED APPLICATIONS

This application is a 35 U.S.C. § 371 national stage application of PCT International Application No. PCT/EP2015/071468 filed on Sep. 18, 2015, the disclosure and content of which is incorporated by reference herein in its entirety.

TECHNICAL FIELD

Embodiments herein relate to reporting of triggered events in a wireless communications network. In particular, embodiments herein relate to network nodes and methods therein for enabling events triggered by a wireless device to be reported in a wireless communications network.

BACKGROUND

In a typical wireless communications network, wireless devices, also known as mobile stations, terminals and/or user equipments, UEs, communicate via a Radio Access Network, RAN, to one or more core networks, CNs. The wireless access network covers a geographical area which is divided into cell areas, with each cell area being served by a base station, e.g. a radio base station, RBS, or network node, which in some networks may also be called, for example, a "NodeB" or "eNodeB". A cell is a geographical area where radio coverage is provided by the radio base station at a base station site or an antenna site in case the antenna and the radio base station are not co-located. Each cell is identified by an identity within the local radio area, which is broadcast in the cell. Another identity identifying the cell uniquely in the whole mobile network is also broadcasted in the cell. The base stations communicate over the air interface operating on radio frequencies with the wireless devices within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for wireless devices. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat architecture comprising radio base station nodes without reporting to RNCs.

However, today, in an EPC of a wireless communications network, there is at times a large amount of signalling being performed which results in a large overhead of message and parameters being transmitted over the EPC interface. Hence, it would be advantageous to reduce the amount of signalling over the EPC interfaces and in the wireless communications network as a whole.

SUMMARY

It is an object of embodiments herein to reduce the amount of signalling in a wireless communication network.

According to a first aspect of embodiments herein, the object is achieved by a method performed by a first network node operating in a wireless communication network for enabling events triggered by a wireless device served by the first network node to be reported in the wireless communications network. The first network node determines that an event has been triggered by the wireless device. Then, the first network node obtains context information associated with the wireless device from a database node that is shared externally by the first network node with one or more network nodes in the wireless communications network, which context information indicates that events triggered in the first network node by the wireless device is to be reported in the wireless communications network. After obtaining the context information, the first network node determines that events triggered by the wireless device is to be reported in the wireless communications network based on the obtained context information.

According to a second aspect of embodiments herein, the object is achieved by a first network node operating in a wireless communication network for enabling events triggered by a wireless device served by the first network node to be reported in the wireless communications network. The first network node is configured to determine that an event has been triggered by the wireless device. The first network node is also configured to obtain context information associated with the wireless device from a database node that is shared externally by the first network node with one or more network nodes in the wireless communications network, which context information indicates that events triggered in the first network node by the wireless device is to be reported in the wireless communications network. The first network node is further configured to determine that events triggered by the wireless device is to be reported in the wireless communications network based on the obtained context information.

According to a third aspect of embodiments herein, the object is achieved by a method performed by a second network node operating in a wireless communications network for enabling events triggered by a wireless device served by the first network node to be reported in the wireless communications network. The second network node receives, from a third network node in the wireless communications network, information indicating that events triggered by the wireless device is to be reported in the wireless communications network. Then, the second network node transmits to a database node that is shared externally by the first network node with one or more network nodes in the wireless communications network, information indicating that events triggered by the wireless device is to be reported in the wireless communications network.

According to a fourth aspect of embodiments herein, the object is achieved by a second network node operating in a wireless communications network for enabling events triggered by a wireless device served by the first network node to be reported in the wireless communications network. The second network node is configured to receive, from a third network node in the wireless communications network, information indicating that events triggered by the wireless device is to be reported in the wireless communications network. The second network node is also configured to transmit, to a database node that is shared externally by the first network node with one or more network nodes in the wireless communications network, information indicating that events triggered by the wireless device is to be reported in the wireless communications network.

According to a fifth aspect of embodiments herein, the object is achieved by a method performed by a third network node operating in a wireless communications network for enabling events triggered by a wireless device to be reported in the wireless communications network. The third network node receives information indicating that reporting of events triggered by the wireless device is to be activated. Then, the third network node transmits, to a database node that is shared externally by the first network node with one or more network nodes in the wireless communications network, information indicating that events triggered by the wireless device is to be reported in the wireless communications network.

According to a sixth aspect of embodiments herein, the object is achieved by a third network node operating in a wireless communications network for enabling events triggered by a wireless device served by a first network node to be reported in the wireless communications network. The third network node is configured to receive information indicating that reporting of events triggered by the wireless device is to be activated. The third network node is also configured to transmit, to a database node that is shared externally by the first network node with one or more network nodes in the wireless communications network, information indicating that events triggered by the wireless device is to be reported in the wireless communications network.

According to a seventh aspect of embodiments herein, the object is achieved by a method performed by a database node in a wireless communications network for enabling events triggered by a wireless device served by the first network node to be reported in the wireless communications network. The database node is shared externally by the first network node with one or more network nodes in the wireless communications network. The database node receives information indicating that events triggered by the wireless device is to be reported in the wireless communications network. Then, the database node adapts context information associated with the wireless device being comprised in the database node to indicate that events triggered by the wireless device is to be reported in the wireless communications network.

According to an eight aspect of embodiments herein, the object is achieved by a database node in a wireless communications network for enabling events triggered by a wireless device served by the first network node to be reported in the wireless communications network. The database node is shared externally by the first network node with one or more network nodes in the wireless communications network. The database node is configured to receive information indicating that events triggered by the wireless device is to be reported in the wireless communications network. Also, the database node is configured to adapt context information associated with the wireless device being comprised in the database node to indicate that events triggered by the wireless device is to be reported in the wireless communications network.

By using an asynchronous activation or de-activation of event reporting functions for a wireless device in the wireless communications network as described above, a large amount of signalling comprising different messages and parameters in the wireless communications network may be avoided as compared to today's synchronous activation or de-activation in wireless communications networks. Furthermore, the described asynchronous activation or de-activation also will not result in any change in latency of the event reporting function as compared to synchronous activation. Hence, the amount of signalling in the wireless communications network is reduced.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 1:
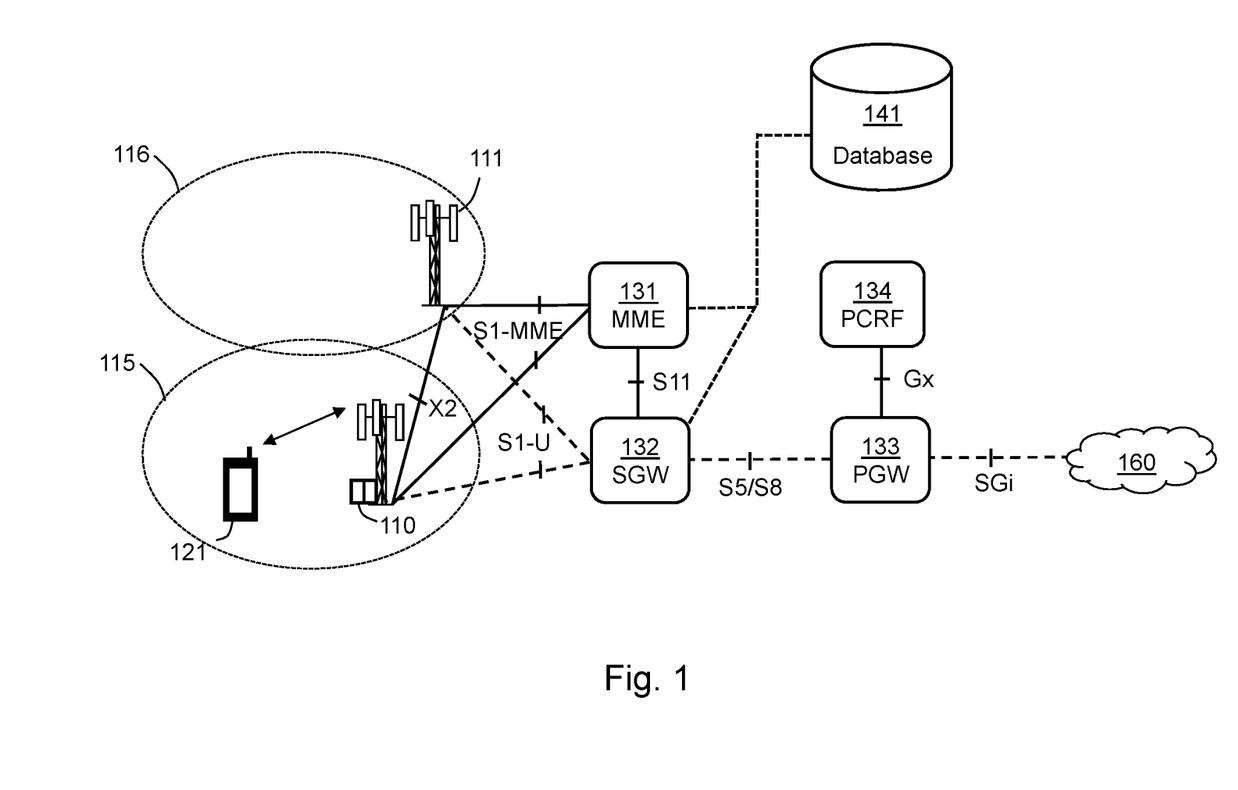
FIG. 1 is a schematic block diagram illustrating embodiments of a network node and a wireless device in a wireless communications network.

FIG. 1 depicts a wireless communications network 100 in which embodiments herein may be implemented. The wireless communications network 100 may be a radio communications network, such as, e.g. LTE, WCDMA, GSM, 3GPP cellular network, or any other cellular network or system. The wireless communications network 100 may also, for example, be referred to as a cellular network or system, radio network or system, or a telecommunications network.

In the example of FIG. 1, the wireless communications network 100 comprises an Evolved Universal Terrestrial Radio Access Network, E-UTRAN, also known as the Long Term Evolution, LTE, radio access, and an Evolved Packet Core, EPC, also known as System Architecture Evolution, SAE, core network.

In the example of FIG. 1, the E-UTRAN of the wireless communications network 100 comprises two base stations 110, 111. The base stations 110, 111 are network units capable of serving wireless devices which are located within its respective coverage area, i.e. cells 115, 116. The base stations 110, 111 may be configured to communicate with each other over an X2 signalling interface. Each of the base stations 110, 111 may also be associated with and configured to communicate with a Mobility Management Entity, MME, over an S1-MME signalling interface. Further, each of the base stations 110, 111 may also be associated with and configured to communicate with a Serving Gateway, SGW, over an S1-U signalling interface. The base stations 110, 111 may in this example e.g. be an eNB, eNodeB, or a Home Node B, a Home eNode B, femto Base Station (BS), pico BS or any other network unit capable to serve wireless devices in the wireless communications network 100.

A wireless device 121 is shown located in cell 115, i.e. located within the coverage area which is served by the network node 110. The wireless device 121 is configured to communicate within the wireless communications system 100 via the base station 110 over a radio link when the wireless device 121 is present in the cell 115 served by the base station 110. The wireless device 121 may also be interchangeably referred to as a mobile station, a terminal, a wireless terminal, and/or a user equipment, UE. It may here also be pointed out that these terms as used herein should be understood by the skilled in the art as non-limiting terms comprising any wireless device or node equipped with a radio interface allowing for receiving and transmitting signals to or from the base station 110.

For example, the wireless device 121 may be a mobile terminal or a wireless terminal, a mobile, a mobile phone, a sensor, a computer such as for example a laptop, a Personal Digital Assistant (PDA) or a tablet computer with wireless capability, a wireless terminal used for Machine Type Communication (MTC), a Machine-to-Machine (M2M) communication device, a wireless device used for Device-to-Device (D2D) communication, a fixed or mobile relay or relay node, a device equipped with a wireless interface, such as a printer or a file storage device, or any other radio network unit capable of communicating over a radio link in a wireless communications system 100.

In the example of FIG. 1, the EPC of the wireless communications network 100 is shown to comprise the main network nodes, i.e. a Mobility Management Entity, MME, 131; a Serving Gateway, SGW, 132; a Packet Data Network (PDN) Gateway, PGW, 133, and a Policy and Charging Rules Function, PCRF, 134. The main function of these network nodes of the EPC is well-known and thoroughly described in 3GPP standards, as well as, their signalling interfaces, as shown in FIG. 1. The PGW 133 is also shown to connect to external services and other PDNs, such as, e.g. the Internet.

According to the embodiments presented herein, the wireless communications network 100 further comprises a database node 141. As shown in FIG. 1, the database node 141 is configured to communicate with the MME 131 and the SGW 132 in the wireless communications network 100. Also, the database node 141 may be shared externally by the MME 131 and SGW 132 with one or several other network nodes configured to operate in the same way as the MME 131 in the wireless communications network 100, i.e. other MMEs (not shown) in the wireless communications network 100.

Figure 5:
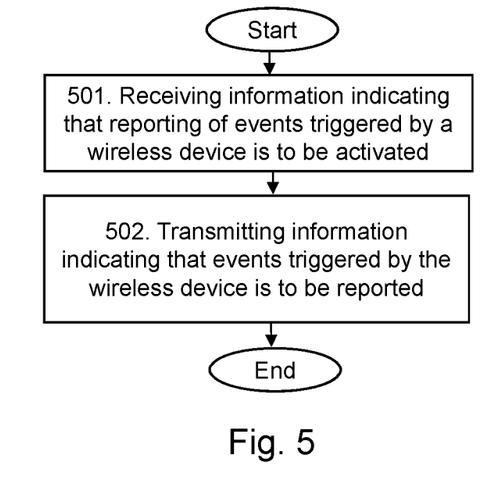
FIG. 5 is a flowchart depicting embodiments of a method in a third network node.
Figure 6:
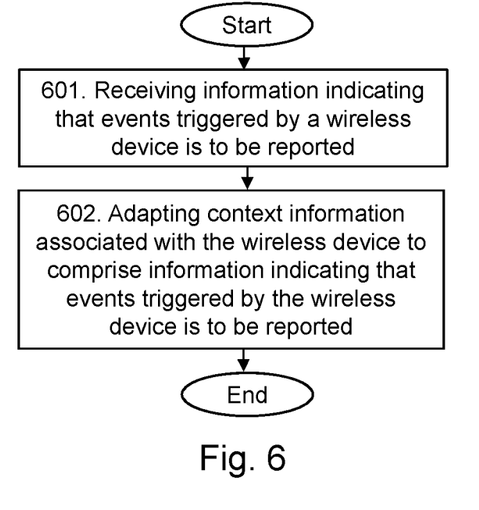
FIG. 6 is a flowchart depicting embodiments of a method in a database node.

Embodiments of a first network node, such as, e.g. the MME 131, and a method therein will be described in more detail below with reference to FIGS. 2, 3 and 6. Also, embodiments of a second network node, such as, e.g. the SGW 132, and a method therein will be described in more detail below with reference to FIGS. 2, 4 and 7. Furthermore, embodiments of a database node, such as, e.g. the database node 141, and a method therein will be described in more detail below with reference to FIGS. 2, 5 and 8.

As part of understanding and developing the embodiments described herein, some issues will first be identified and discussed below in more detail.

Recent developments in wireless communication discusses the possibilities of implementing a virtualized EPC, vEPC, in which control and user plane signalling are separated within a wireless communications network. It has been suggested using a stateless user-plane architecture for the vEPC which means that the control logic in the wireless communications network for serving and governing the connections towards wireless devices will be interchangeable and stateless. Here, the term "stateless" means that no state or context information, or may be only a small amount of state or context information, associated with a wireless device will be stored at the control logic site in the wireless communications network, such as, e.g. in the MME and/or SGW. Instead, states and context information associated with wireless devices will be stored in an external database, whereby the control logic will read the state and/or context information of the wireless devices from the external database only when invoking or executing well-defined procedures in the wireless communications network.

One example of a function that needs to be handled by such a stateless control logic in a vEPC is the so-called Event Reporting Function, ERF. The ERF detects events triggered by wireless devices in the wireless communications network.

An example of an event that the ERF may detect for a wireless device is when the wireless device leaves or enters a certain area, e.g. a Presence Reporting Area, PRA. In current wireless communications network, when the ERF is activated for a wireless device and the ERF detects such a PRA event, the ERF is configured to report the detected event. The report may comprise a PRA identifier and information indicating whether the wireless device is inside or outside the PRA. This report may, for example, be sent to a Policy and Charging Rules Function, PCRF, in the EPC. The PCRF may also be configured to activate or de-activate reporting of the triggered events by the ERF for a specific IP connectivity access network, IP CAN, layer of the wireless device in the EPC.

However, today, the procedures for activating and de-activating the ERF for a specific IP CAN layer of the wireless device in the EPC is performed using GPRS Tunnel Protocol, GTP, signalling, at least in cases where GTP based access is used in the wireless communication network. The GTP signalling is commonly performed over the interfaces between the network nodes in the EPC. For example, for PRA reporting, the activation or de-activation of the ERF for a specific IP CAN layer of the wireless device uses GTP signalling from the PGW via the SGW to the MME over the S5/S8 and S11 interfaces.

The activation or de-activation of the ERF in the EPC today may be said to be done in a synchronous way. This means that when activation or de-activation is triggered in the PCRF, there is message interaction over the EPC interfaces, such as, the S5/S8 and S11 interfaces, to immediately propagate the activation over the necessary network nodes, such as, MME, SGW and PGW in the EPC. However, the activation or de-activation of ERF are not always time critical, and there is no real need to send these activation or de-activation messages immediately across EPC. The reason why it is performed in this way in wireless communications network today is simply that the messages in GTP interfaces are available and may be reused for transmitting these types of activation or de-activation messages.

In fact, in many cases, when the activation or de-activation has been performed in the EPC, there is no event to report unless the wireless device 121 performs some sort of activity. For example, when the ERF is activated when the wireless device 121 is in an IDLE mode, no event reporting will occur until the wireless device 121 at a later stage starts a new procedure, such as, e.g. performs a Service Request, SR, or until a network initiated procedure is started. In both cases, there will be a time interval between the activation and any actual invoking of the event reporting. But as long as the wireless device 121 is in the IDLE mode, the triggering of an event will not happen.

These issues are addressed by the embodiments described herein, wherein the advantages of the stateless architecture of the vEPC is fully used by introducing an asynchronous way of indicating the activation or de-activation of the ERF.

Figure 2:
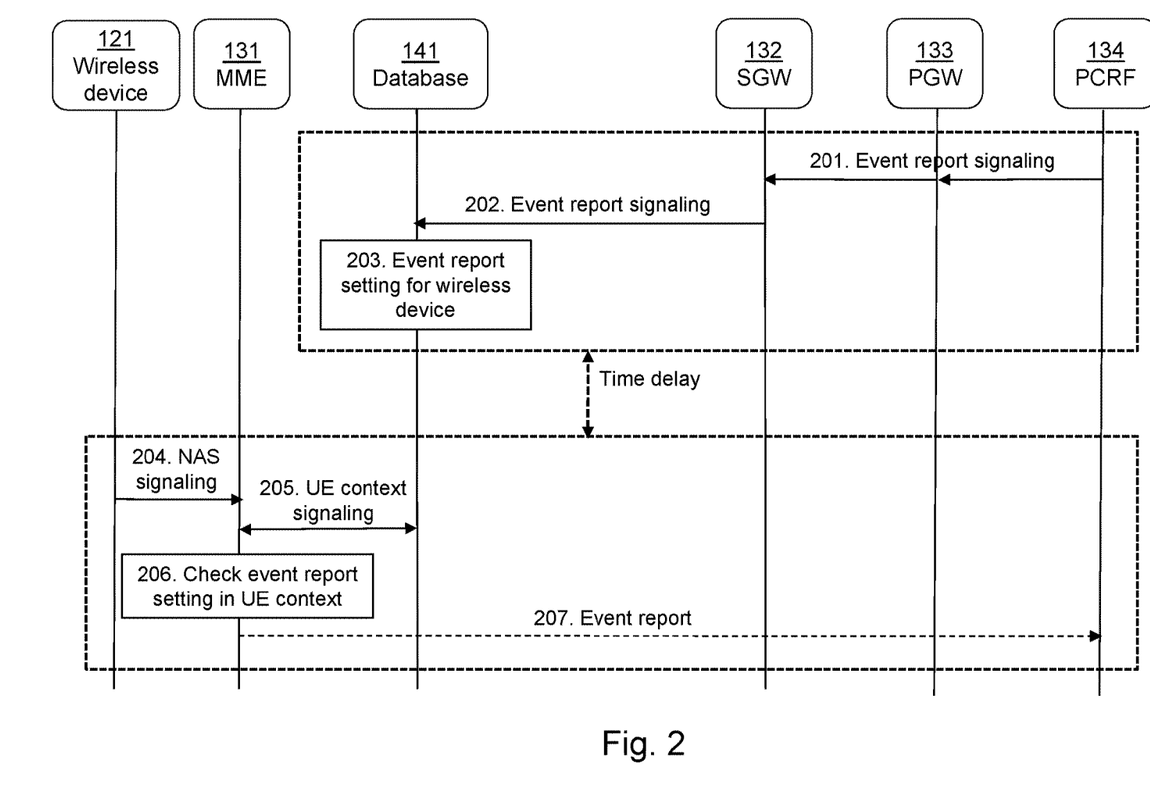
FIG. 2 is a signalling diagram depicting an example of methods in a first network node, a second network node and a database node according to some embodiments.
Figure 3:
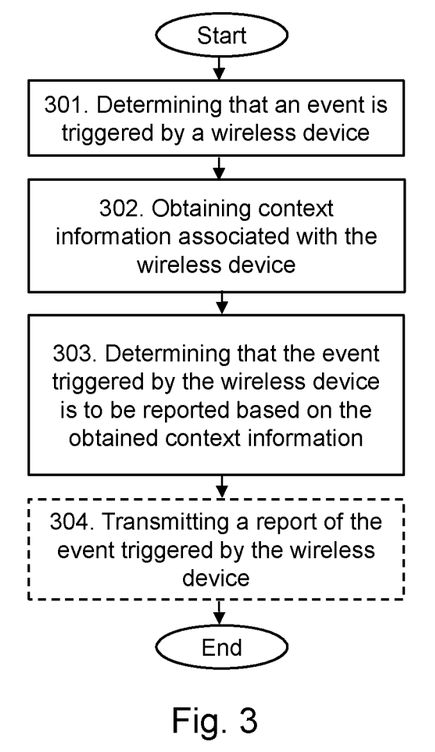
FIG. 3 is a flowchart depicting embodiments of a method in a first network node.

FIG. 2 depicts an example of a signalling diagram depicting embodiments of methods in a first network node, MME 131, a second network node, SGW 132, and a database node 141. This example shows a procedure wherein PRA reporting is activated for a wireless device 121 in the wireless communications network 100.

In Action 201, the PCRF 134 may be triggered to activate PRA reporting for a wireless device 121. In response, the PCRF 134 may signal information to the database 141 indicating that PRA reporting is to be activated for the wireless device 121, i.e. perform event report signalling. In some embodiments, the PCRF 134 may signal the information to the SGW 132 via the PGW 133. In turn, the SGW 132 may signal the information to the database 141, see action 202 below. For example, the PCRF 134 may be triggered to activate PRA reporting for a wireless device 121 by receiving signalling from an application associated with the wireless device 121 or by a Command Line Interface, CLI, user for the wireless device 121.

In Action 202, the SGW 132 may optionally, e.g. in response to event report signalling received in Action 201, send information to the database node 141 causing it to set an indicator, e.g. a flag, a label, a number, a bit, a bit pattern or similar, indicating that PRA reporting for the wireless device 121 is to be activated.

In Action 203, the database node 141 may, based on the information from the PCRF 134 or SGW 132, set an indicator or report-indication, such as, e.g. a flag, a label, a number, a bit, a bit pattern or similar indicator or information element, IE, which indicates that PRA reporting for the wireless device 121 is active. The indicator may be set by the database node 141 in the UE Context information for the wireless device 121 being stored in the database node 141.

Then, in Action 204, the wireless device 121 may start a NAS signalling towards the MME 131. In some embodiments, the NAS signalling may correspond to, for example, a Service Request, SR, message, a Tracking Area Update, TAU, message, or similar message, that is sent by the wireless device 121 to the MME 131 via the Radio Access network, RAN, e.g. via the network node 110. It should be noted that the time delay between the setting of the indicator in the database node 141 in Action 203 and the time the wireless device 121 here starts the NAS procedure may be arbitrary, since these events are separate and independent from each other. Hence, this procedure may be referred to as asynchronous.

In Action 205, in response to the NAS signalling from the wireless device 121, the MME 131 may obtain or read the indicator in the UE context information for the wireless device 121 set and stored in the database node 141. This may be performed since the MME 131 is stateless. Hence, the MME 131 will obtain or read information indicating that PRA reporting for the wireless device 121 is active from the database node 141.

Therefore, in Action 206, the MME 131 may check the obtained indicator and be informed that PRA reporting for the wireless device 121 is active. Hence, the MME 131 is informed that PRA reporting for the wireless device 121 is to be performed for the wireless device 121.

In Action 207, the MME 131 may then send an event report, which in this case is a PRA report. Here, the PRA report is only sent when the location of the wireless device 121 has changed such that the wireless device 121 has moved in or out of the PRA area.

Furthermore, Actions 204-207 in FIG. 2 may be repeated over and over again as long as the flag indicating that PRA reporting for the wireless device 121 is active is set for the wireless device 121 in the database node 141. Actions 204-207 in FIG. 2 may be repeatedly performed whenever the MME 131 is triggered to read the indicator set and stored for the wireless device 121 in the database node 141. This is typically due to repeated NAS signalling from the wireless device 121 or further messages from another network node in the wireless communications network 100.

A similar procedure as described by Actions 201-207 may be performed for the de-activation of the PRA reporting, for example, when the PCRF 134 is triggered to end PRA reporting for the wireless device 121 in Action 201. Of course, in this case, an indicator indicating that PRA reporting for the wireless device 121 is not active may be set and stored by the database node 141, e.g. in the UE Context information for the wireless device 121 in the database node 141. Alternatively, the indicator indicating that PRA reporting for the wireless device 121 is active may simply be removed or deleted by the database node 141, e.g. in the UE Context information for the wireless device 121 in the database node 141.

Furthermore, it should also be noted that, e.g. in the UE Context information for the wireless device 121 in the database node 141, one indicator may be set per event reporting function. One example of an event reporting function, besides PRA reporting as described in FIG. 2, is UE Location Identifier, ULI, reporting. Actions corresponding to Action 201-207 may in this case be performed for the ULI reporting, or other event report functions.

Example of embodiments of a method performed by a first network node 131 operating in a wireless communication network 100 for enabling events triggered by a wireless device 121 served by the first network node 131 to be reported in the wireless communications network 100 will now be described with reference to the flowchart depicted in FIG. 3. FIG. 3 is an illustrated example of actions or operations which may be taken by the first network node 131 in the wireless communication network 100. It should be noted that, in some embodiments, the first network node 131 may be configured to operate as a MME 131 in the wireless communications network 100. The method may comprise the following actions.

Action 301

The first network node 131 initially determines that an event has been triggered by the wireless device 121. In some embodiments, the first network node 131 may determine that an event has been triggered by the wireless device 121 comprising receiving Non-Access Stratum, NAS, signalling from the wireless device 121. According to one example of the NAS signalling is that the first network node 131 may receive a Tracking Area Update, TAU, or a Service Request, SR, from the wireless device 121. In some embodiments, e.g. based on NAS signalling from the wireless device 121, the event triggered by the wireless device 121 in the first network node 131 may, for example, be one or more of a User Location Information, ULI, reporting or a Presence Reporting Area, PRA, reporting.

Action 302

After the determination in Action 201, the first network node 131 obtains context information associated with the wireless device 121 from a database node 141. The database node is shared externally by the first network node 131 with one or more network nodes in the wireless communications network 100. The context information indicates that events triggered in the first network node 131 by the wireless device 121 is to be reported in the wireless communications network 100. In some embodiments, the context information may comprise one or more flags, bits and/or Information Elements, IEs, which indicate that events triggered by the wireless device 121 is to be reported in the wireless communications network 100.

Action 303

Then, the first network node 131 determines that events triggered by the wireless device 121 is to be reported in the wireless communications network 100 based on the obtained context information.

Action 304

Optionally, the first network node 131 may transmit a report of the event triggered by the wireless device 121 when determined that events triggered by the wireless device 121 is to be reported in the wireless communications network 100.

Figure 4:
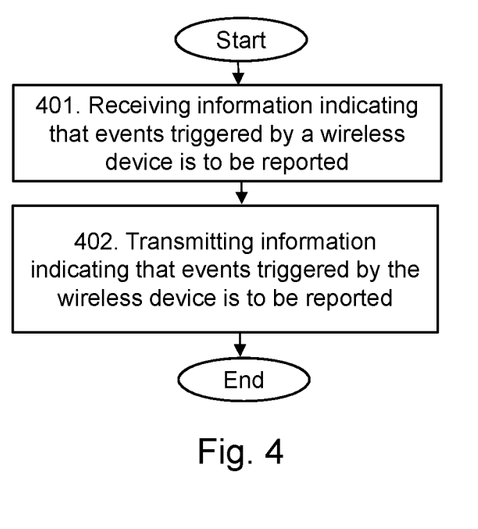
FIG. 4 is a flowchart depicting embodiments of a method in a second network node.

Example of embodiments of a method performed by a second network node 132 operating in a wireless communications network 100 for enabling events triggered by a wireless device 121 served by a first network node 131 to be reported in the wireless communications network 100 will now be described with reference to the flowchart depicted in FIG. 4. FIG. 4 is an illustrated example of actions or operations which may be taken by the second network node 132 in the wireless communication network 100. It should be noted that, in some embodiments, the first network node 131 may be configured to operate as a MME 131, the second network node 132 is configured to operate as an SGW 132, and the third network node 134 is configured to operate as a PCRF 134 in the wireless communications network 100. The method may comprise the following actions.

Action 401

First, the second network node 132 receives, from a third network node 134 in the wireless communications network 100, information indicating that events triggered by the wireless device 121 is to be reported in the wireless communications network 100.

Action 402

After receiving the information in Action 401, the network node 110 transmits, to a database node 141 that is shared externally by the first network node 131 with one or more network nodes in the wireless communications network 100, information indicating that events triggered by the wireless device 121 is to be reported in the wireless communications network 100.

Example of embodiments of a method performed by a third network node 134 operating in a wireless communications network 100 for enabling events triggered by a wireless device 121 served by a first network node 131 to be reported in the wireless communications network 100 will now be described with reference to the flowchart depicted in FIG. 5. FIG. 5 is an illustrated example of actions or operations which may be taken by the third network node 134 in the wireless communication network 100. It should be noted that, in some embodiments, the third network node 134 may be configured to operate as a PCRF 134. The method may comprise the following actions.

Action 501

First, the database node 141 receives information indicating that reporting of events triggered by the wireless device 121 is to be activated. This may also be referred to as the third network node 141 being triggered to activate an event reporting function the wireless device 121. For example, as described in reference to the embodiments in FIG. 2, the PCRF 134 may be triggered to activate PRA or ULI reporting for a wireless device 121. This may be performed by receiving signalling from an application associated with the wireless device 121 or by a Command Line Interface, CLI, user for the wireless device 121.

Action 502

After receiving the information in Action 501, the third network node 134 transmits, to a database node 141 that is shared externally by the first network node 131 with one or more network nodes in the wireless communications network 100, information indicating that events triggered by the wireless device 121 is to be reported in the wireless communications network 100. In some embodiments, the third network node 134 may transmit the information directly to the database node 141 or via a second network node 132, e.g. SGW 132, in the wireless communications network 100.

Example of embodiments of a method performed by a database node 141 in a wireless communications network 100 for enabling events triggered by a wireless device 121 served by the first network node 131 to be reported in the wireless communications network 100 will now be described with reference to the flowchart depicted in FIG. 6. The database node 141 is shared externally by the first network node 131 with one or more network nodes in the wireless communications network 100. FIG. 6 is an illustrated example of actions or operations which may be taken by the database node 141 in the wireless communication network 100. It should be noted that, in some embodiments, the first network node 131 may be configured to operate as a MME 131. The method may comprise the following actions.

Action 601

First, the database node 141 receives information indicating that events triggered by the wireless device 121 is to be reported in the wireless communications network 100. In some embodiments, this information may be received from a second network node 132 in the wireless communications network 100, wherein the second network node 132 may be configured to operate as an SGW 132 in the wireless communications network 100. In some embodiments, this information may be received from a third network node 134 in the wireless communications network 100, wherein the third network node 134 may be configured to operate as an PCRF 134 in the wireless communications network 100.

Action 602

After receiving the information in Action 601, the database node 141 adapts context information associated with the wireless device 121 being comprised in the database node 141 to indicate that events triggered by the wireless device 121 is to be reported in the wireless communications network 100. In some embodiments, the database node 141 may perform the adaptation by setting one or more flags, bits and/or Information Elements, IEs, in the context information associated with the wireless device 121 indicating that events triggered by the wireless device 121 is to be reported in the wireless communications network 100.

Figure 7:
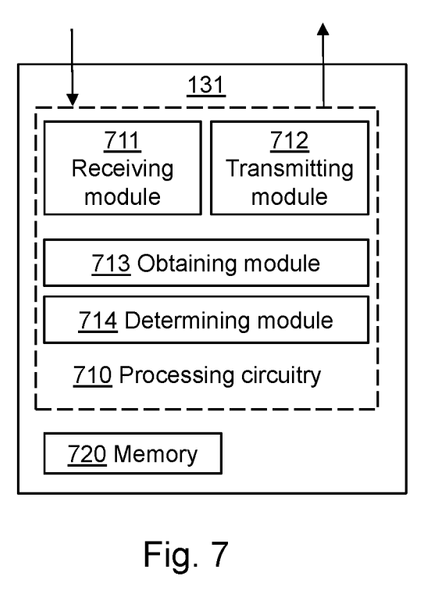
FIG. 7 is a block diagram depicting embodiments of a first network node.

To perform the method actions in the first network node 131 operating in a wireless communication network 100 for enabling events triggered by a wireless device 121 served by the first network node 131 to be reported in the wireless communications network 100, the first network node 131 may comprise the following arrangement depicted in FIG. 7. FIG. 7 shows a schematic block diagram of embodiments of the first network node 131. The embodiments of the first network node 131 described herein may be considered as independent embodiments or may be considered in any combination with each other to describe non-limiting examples of the example embodiments described herein.

The first network node 131 may comprise processing circuitry 710 and a memory 720. The first network node 131 or processing circuitry 710, which also may be referred to a processor or processing module, may further comprise a receiving module 711 and a transmitting module 712. The receiving module 711 may also be referred to as a receiver, and the transmitting module 712 may also be referred to as a transmitter. In particular embodiments, some or all of the functionality described above as being performed by first network node 131 may be provided by the processing circuitry 710 executing instructions stored on a computer-readable medium, such as the memory 720 shown in FIG. 7. Alternative embodiments of the network node 131 may comprise additional components, such as, the determining module 713 and the obtaining module 714, responsible for providing functionality necessary to support the embodiments described herein.

The first network node 131 or processing circuitry 710 is configured to, or may comprise the determining module 713 configured to, determine that an event has been triggered by the wireless device 121. Also, the first network node 131 or processing circuitry 710 is configured to, or may comprise the obtaining module 714 configured to, obtain context information associated with the wireless device 121 from a database node 141 that is shared externally by the first network node 131 with one or more network nodes in the wireless communications network 100, which context information indicates that events triggered in the first network node 131 by the wireless device 121 is to be reported in the wireless communications network 100. Furthermore, the first network node 131 or processing circuitry 710 is configured to, or may comprise the determining module 713 configured to, determine that events triggered by the wireless device 121 is to be reported in the wireless communications network 100 based on the obtained context information.

In some embodiments, the first network node 131 or processing circuitry 710 may be configured to, or may comprise the transmitting module 712 configured to, transmit a report of the event triggered by the wireless device 121 when determined that events triggered by the wireless device 121 is to be reported in the wireless communications network 100.

In some embodiments, the first network node 131 or processing circuitry 710 is configured to, or may comprise the receiving module 711 configured to, determine that an event has been triggered by the wireless device 121 by receiving Non-Access Stratum, NAS, signalling, wherein the NAS signalling is one or more of: a Tracking Area Update, TAU, or a Service Request, SR. In some embodiments, the event triggered by the wireless device 121 in the network node 131 is one or more of: a User Location Information, ULI, reporting or a Presence Reporting Area, PRA, reporting.

In some embodiments, the context information may comprise one or more flags, bits and/or Information Elements, IEs, which indicate that events triggered by the wireless device 121 is to be reported in the wireless communications network 100. In some embodiments, the first network node 131 may be configured to operate as a Mobility Management Entity, MME, in the wireless communications network 100.

Furthermore, embodiments of the first network node 131 operating in a wireless communication network 100 for enabling events triggered by a wireless device 121 served by the first network node 131 to be reported in the wireless communications network 100 may be implemented through one or more processors, such as the processing circuitry 710 in the first network node 131 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the first network node 131. The computer program code may e.g. be provided as pure program code in the first network node 131 or on a server and downloaded to the first network node 131.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 720 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
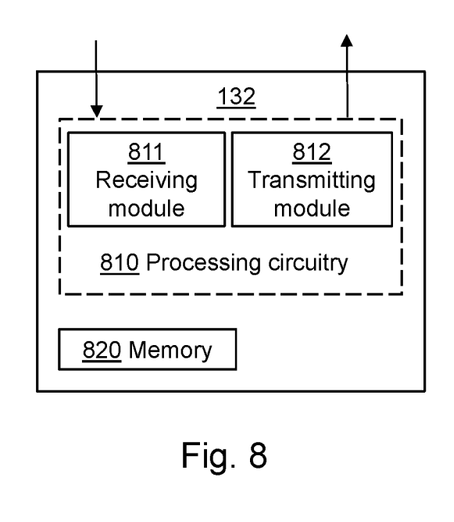
FIG. 8 is a block diagram depicting embodiments of a second network node.

To perform the method actions in a second network node 132 operating in a wireless communications network 100 for enabling events triggered by a wireless device 121 served by the first network node 131 to be reported in the wireless communications network 100, the second network node 132 may comprise the following arrangement depicted in FIG. 8. FIG. 8 shows a schematic block diagram of embodiments of the second network node 132. The embodiments of the second network node 132 described herein may be considered as independent embodiments or may be considered in any combination with each other to describe non-limiting examples of the example embodiments described herein.

The second network node 132 may comprise processing circuitry 810 and a memory 820. The second network node 132 or processing circuitry 810, which also may be referred to a processor or processing module, may further comprise a receiving module 811 and a transmitting module 812. The receiving module 811 may also be referred to as a receiver, and the transmitting module 812 may also be referred to as a transmitter. In particular embodiments, some or all of the functionality described above as being performed by second network node 132 may be provided by the processing circuitry 810 executing instructions stored on a computer-readable medium, such as the memory 820 shown in FIG. 8.

The second network node 132 or processing circuitry 810 is configured to, or may comprise the receiving module 611 configured to, receive, from a third network node 134 in the wireless communications network 100, information indicating that events triggered by the wireless device 121 is to be reported in the wireless communications network 100. Also, the second network node 132 or processing circuitry 810 is configured to, or may comprise the transmitting module 812 configured to, transmit, to a database node 141 that is shared externally by the first network node 131 with one or more network nodes in the wireless communications network 100, information indicating that events triggered by the wireless device 121 is to be reported in the wireless communications network 100.

In some embodiments, the first network node 131 is configured to operate as a MME 131, the second network node 132 is configured to operate as a SGW 132, and the third network node 134 is configured to operate as a PCRF 134 in the wireless communications network 100.

Furthermore, embodiments of the second network node 132 operating in a wireless communications network 100 for enabling events triggered by a wireless device 121 served by the first network node 131 to be reported in the wireless communications network 100 may be implemented through one or more processors, such as the processing circuitry 810 in the second network node 132 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the second network node 132. The computer program code may e.g. be provided as pure program code in the second network node 132 or on a server and downloaded to the second network node 132.

Those skilled in the art will also appreciate that the processing circuitry 810 and the memory 820 described above may refer to a combination of analog and digital circuits, and/or one or more processors configured with software and/or firmware, e.g. stored in a memory, that when executed by the one or more processors such as the processing circuitry 820 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 9:
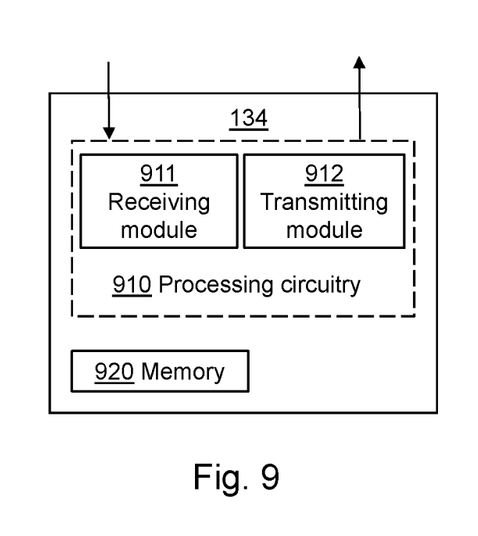
FIG. 9 is a block diagram depicting embodiments of a third network node.

To perform the method actions in the third network node 134 operating in a wireless communications network 100 for enabling events triggered by a wireless device 121 served by a first network node 131 to be reported in the wireless communications network 100, the third network node 134 may comprise the following arrangement depicted in FIG. 9. FIG. 9 shows a schematic block diagram of embodiments of the third network node 134. The embodiments of the third network node 134 described herein may be considered as independent embodiments or may be considered in any combination with each other to describe non-limiting examples of the example embodiments described herein.

The third network node 134 may comprise processing circuitry 910 and a memory 920. The third network node 134 or processing circuitry 910, which also may be referred to a processor or processing module, may further comprise a receiving module 911 and a transmitting module 912. The receiving module 911 may also be referred to as a receiver, and the transmitting module 912 may also be referred to as a transmitter. In particular embodiments, some or all of the functionality described above as being performed by third network node 134 may be provided by the processing circuitry 910 executing instructions stored on a computer-readable medium, such as the memory 920 shown in FIG. 9.

The third network node 134 or processing circuitry 910 is configured to, or may comprise the receiving module 911 configured to, receive information indicating that reporting of events triggered by the wireless device 121 is to be activated. Also, the third network node 134 or processing circuitry 910 is configured to, or may comprise the transmitting module 912 configured to, transmit, to a database node 141 that is shared externally by the first network node 131 with one or more network nodes in the wireless communications network 100, information indicating that events triggered by the wireless device 121 is to be reported in the wireless communications network 100.

In some embodiments, the first network node 131 is configured to operate as a Mobility Management Entity, MME, and the third network node 134 is configured to operate as a Policy and Charging Rules Function, PCRF, in the wireless communications network 100.

Furthermore, embodiments of the third network node 134 operating in a wireless communications network 100 for enabling events triggered by a wireless device 121 served by the first network node 131 to be reported in the wireless communications network 100 may be implemented through one or more processors, such as the processing circuitry 910 in the third network node 134 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the third network node 134. The computer program code may e.g. be provided as pure program code in the third network node 134 or on a server and downloaded to the third network node 134.

Those skilled in the art will also appreciate that the processing circuitry 910 and the memory 920 described above may refer to a combination of analog and digital circuits, and/or one or more processors configured with software and/or firmware, e.g. stored in a memory, that when executed by the one or more processors such as the processing circuitry 920 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 10:
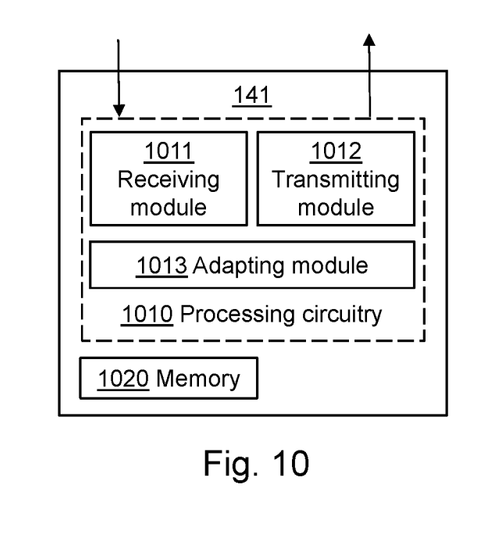
FIG. 10 is a block diagram depicting embodiments of a database node.

To perform the method actions in a database node 141 operating in a wireless communications network 100 for enabling events triggered by a wireless device 121 served by the first network node 131 to be reported in the wireless communications network 100, the database node 141 may comprise the following arrangement depicted in FIG. 10. FIG. 10 shows a schematic block diagram of embodiments of the database node 141. The embodiments of the database node 141 described herein may be considered as independent embodiments or may be considered in any combination with each other to describe non-limiting examples of the example embodiments described herein. The database node 141 is shared externally by the first network node 131 with one or more network nodes in the wireless communications network 100.

The database node 141 may comprise processing circuitry 1010 and a memory 1020. The database node 141 or processing circuitry 1010, which also may be referred to a processor or processing module, may further comprise a receiving module 1011 and a transmitting module 1012. The receiving module 1011 may also be referred to as a receiver, and the transmitting module 1012 may also be referred to as a transmitter. In particular embodiments, some or all of the functionality described above as being performed by database node 141 may be provided by the processing circuitry 1010 executing instructions stored on a computer-readable medium, such as the memory 1020 shown in FIG. 10. Alternative embodiments of the database node 141 may comprise additional components, such as, the adapting module 1013, responsible for providing functionality necessary to support the embodiments described herein.

The database node 141 or processing circuitry 1010 is configured to, or may comprise the receiving module 1011 configured to, receive information indicating that events triggered by the wireless device 121 is to be reported in the wireless communications network 100. Also, the database node 141 or processing circuitry 1010 is configured to, or may comprise the adapting module 1013 configured to, adapt context information associated with the wireless device 121 being comprised in the database node 141 to indicate that events triggered by the wireless device 121 is to be reported in the wireless communications network 100.

In some embodiments, the database node 141 or processing circuitry 1010 is configured to, or may comprise the adapting module 1013 configured to, adapt the context information by setting one or more flags, bits and/or Information Elements, IEs, in the context information associated with the wireless device 121 indicating that events triggered by the wireless device 121 is to be reported in the wireless communications network 100. In some embodiments, the first network node 131 is configured to operate as a MME 131.

Furthermore, embodiments of the database node 141 operating in a wireless communications network 100 for enabling events triggered by a wireless device 121 served by the first network node 131 to be reported in the wireless communications network 100 may be implemented through one or more processors, such as the processing circuitry 1010 in the database node 141 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the database node 141. The computer program code may e.g. be provided as pure program code in the database node 141 or on a server and downloaded to the database node 141.

Those skilled in the art will also appreciate that the processing circuitry 1010 and the memory 1020 described above may refer to a combination of analog and digital circuits, and/or one or more processors configured with software and/or firmware, e.g. stored in a memory, that when executed by the one or more processors such as the processing circuitry 1020 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

UE User Equipment
RAN Radio Access Network
CN Core Network
RBS Radio Base Station
UMTS Universal Mobile Telecommunications System
GSM Global System for Mobile Communications
UTRAN UMTS terrestrial RAN
WCDMA Wideband Code Division Multiple Access
HSPA High Speed Packet Access
RNC Radio Network Controller
BSC Base Station Controller
EPS Evolved Packet System
E-UTRAN Evolved Universal Terrestrial Radio Access Network
LTE Long Term Evolution
EPC Evolved Packet Core
SAE System Architecture Evolution
MME Mobility Management Entity
SGW Serving Gateway
PGW PDN Gateway
PDN Packet Data Network
PCRF Policy and Charging Rules Function
PRA Presence Reporting Area
ERF Event Reporting Function
IP CAN IP connectivity access network
GTP GPRS Tunnel Protocol

The invention claimed is:

1. A method performed by a first network node operating in a wireless communication network for enabling events triggered by a wireless device served by the first network node to be reported in the wireless communications network, the method comprising:
   determining, by the first network node, that an event has been triggered by the wireless device served by the first network node, the first network node operating in the wireless communication network;
   responsive to determining that the event has been triggered by the wireless device, obtaining, by the first network node, context information associated with the wireless device from a database node that is shared externally by the first network node with one or more other network nodes in the wireless communications network, the context information indicating that the event triggered in the first network node by the wireless device is to be reported in the wireless communications network; and
   determining, by the first network node, that the event triggered by the wireless device is to be reported, by the first network node, in the wireless communications network based on the obtained context information;
   wherein the first network node is configured to operate as a Mobility Management Entity, MME, in the wireless communications network, and wherein the second network node is configured to operate as a serving gateway in the wireless communication network.

2. The method according to claim 1, further comprising:
   transmitting a report of the event triggered by the wireless device to a second network node in the wireless communication network in response to determining that the event triggered by the wireless device is to be reported in the wireless communications network.

3. The method according to claim 1, wherein the determining that the event has been triggered further comprises determining that the event has been triggered based on receiving Non-Access Stratum, NAS signaling from the wireless device.

4. The method according to claim 3, wherein the NAS signaling is one or more of: a Tracking Area Update, TAU, or a Service Request, SR.

5. The method according to claim 1, wherein the event triggered by the wireless device is reported as part of: a User Location Information, ULI, reporting or a Presence Reporting Area, PRA, reporting.

6. The method according to claim 1, wherein the context information comprises one or more flags, bits and/or Information Elements, IEs, which indicate that the event triggered by the wireless device is to be reported in the wireless communications network.

7. The method according to claim 1, wherein determining that the event has been triggered by the wireless device comprises determining that the wireless device has entered or left the wireless communication network.

8. The method according to claim 1, wherein obtaining the context information associated with the wireless device comprises:
   determining a type of the event;
   transmitting a request for the context information to the database node wherein the request comprises the type of the event and an identification of the wireless device; and
   responsive to transmitting the request, receiving the context information from the database node.

9. The method according to claim 1, wherein obtaining the context information associated with the wireless device comprises obtaining the context information associated with the wireless device from the database node that is independent and distinct from the wireless device and that is independent and distinct from the first network node.

10. A first network node operating in a wireless communication network for enabling events triggered by a wireless device served by the first network node to be reported in the wireless communications network, wherein the network node is configured to:
    determine, by the first network node, that an event has been triggered by the wireless device served by the first network node;
    responsive to determining that the event has been triggered by the wireless device, obtain, by the first network node, context information associated with the wireless device from a database node that is shared externally by the first network node with one or more other network nodes in the wireless communications network, the context information indicating that the event triggered in the first network node by the wireless device are to be reported in the wireless communications network; and
    determine, by the first network node, that the event triggered by the wireless device is to be reported, by the first network node, in the wireless communications network based on the obtained context information;
    wherein the first network node is configured to operate as a Mobility Management Entity, MME, in the wireless communications network, and wherein the second network node is configured to operate as a serving gateway in the wireless communication network.

11. The first network node according to claim 10, wherein the first network node is further configured to:

transmit a report of the event triggered by the wireless device to a second network node in the wireless communication network in response to determining that the event triggered by the wireless device is to be reported in the wireless communications network.

12. The first network node according to claim 10, wherein the first network node is further configured to determine that an event has been triggered by the wireless device based on Non-Access Stratum, NAS, signaling received from the wireless device.

13. The first network node according to claim 12 wherein the NAS signaling is one or more of: a Tracking Area Update, TAU, or a Service Request, SR.

14. The first network node according to claim 10, wherein the event triggered by the wireless device is one or more of: a User Location Information, ULI, reporting or a Presence Reporting Area, PRA, reporting.

15. The first network node according to claim 10, wherein the context information comprises one or more flags, bits and/or Information Elements, IEs, which indicate that the event triggered by the wireless device is to be reported in the wireless communications network.

16. The first network node according to claim 10, wherein being configured to determine that the event has been triggered comprises being configured to determine that the wireless device has entered or left the wireless communication network.

17. The first network node according to claim 10, wherein being configured to obtain the context information associated with the wireless device comprises being configured to:
   determine a type of the event;
   transmit a request for the context information to the database node wherein the request comprises the type of the event and an identification of the wireless device; and
   responsive to transmitting the request, receive the context information from the database node.

18. The first network node according to claim 10, wherein being configured to obtain the context information associated with the wireless device comprises being configured to obtain the context information associated with the wireless device from the database node that is independent and distinct from the wireless device and that is independent and distinct from the first network node.

19. A method performed by a database node in a wireless communications network for enabling events triggered by a wireless device served by the first network node to be reported in the wireless communications network, the method comprising:
   receiving, by the database node, first information indicating that events triggered by the wireless device served by the first network node are to be reported in the wireless communications network, the database node being in the wireless communication network and shared externally by the first network node with one or more other network nodes in the wireless communications network; and
   responsive to receiving the first information, adapting, by the database node, context information associated with the wireless device being comprised in the database node based on the first information to indicate that events triggered by the wireless device are to be reported, by the first network node, in the wireless communications network;
   wherein the first network node is configured to operate as a Mobility Management Entity, MME, in the wireless communications network, and wherein the second network node is configured to operate as a serving gateway in the wireless communication network.

20. The method according to claim 19, wherein the first network node is configured to operate as a Mobility Management Entity, MME.

* * * * *

UNITED STATES PATENT AND TRADEMARK OFFICE
CERTIFICATE OF CORRECTION

PATENT NO. : 10,349,301 B2
APPLICATION NO. : 15/759956
DATED : July 9, 2019
INVENTOR(S) : Toth et al.

Page 1 of 1

It is certified that error appears in the above-identified patent and that said Letters Patent is hereby corrected as shown below:

In the Specification

In Column 12, Lines 51-52, delete "processing circuitry 720" and insert -- processing circuitry 710 --, therefor.

In Column 13, Lines 57-58, delete "processing circuitry 820" and insert -- processing circuitry 810 --, therefor.

In Column 14, Lines 62-63, delete "processing circuitry 920" and insert -- processing circuitry 910 --, therefor.

In Column 16, Lines 10-11, delete "processing circuitry 1020" and insert -- processing circuitry 1010 --, therefor.

Signed and Sealed this
Eighteenth Day of August, 2020

Andrei Iancu
*Director of the United States Patent and Trademark Office*